June 27, 1950 W. HEUSSER 2,513,023
PISTON AND CONNECTING ROD ASSEMBLY
Filed Sept. 11, 1946
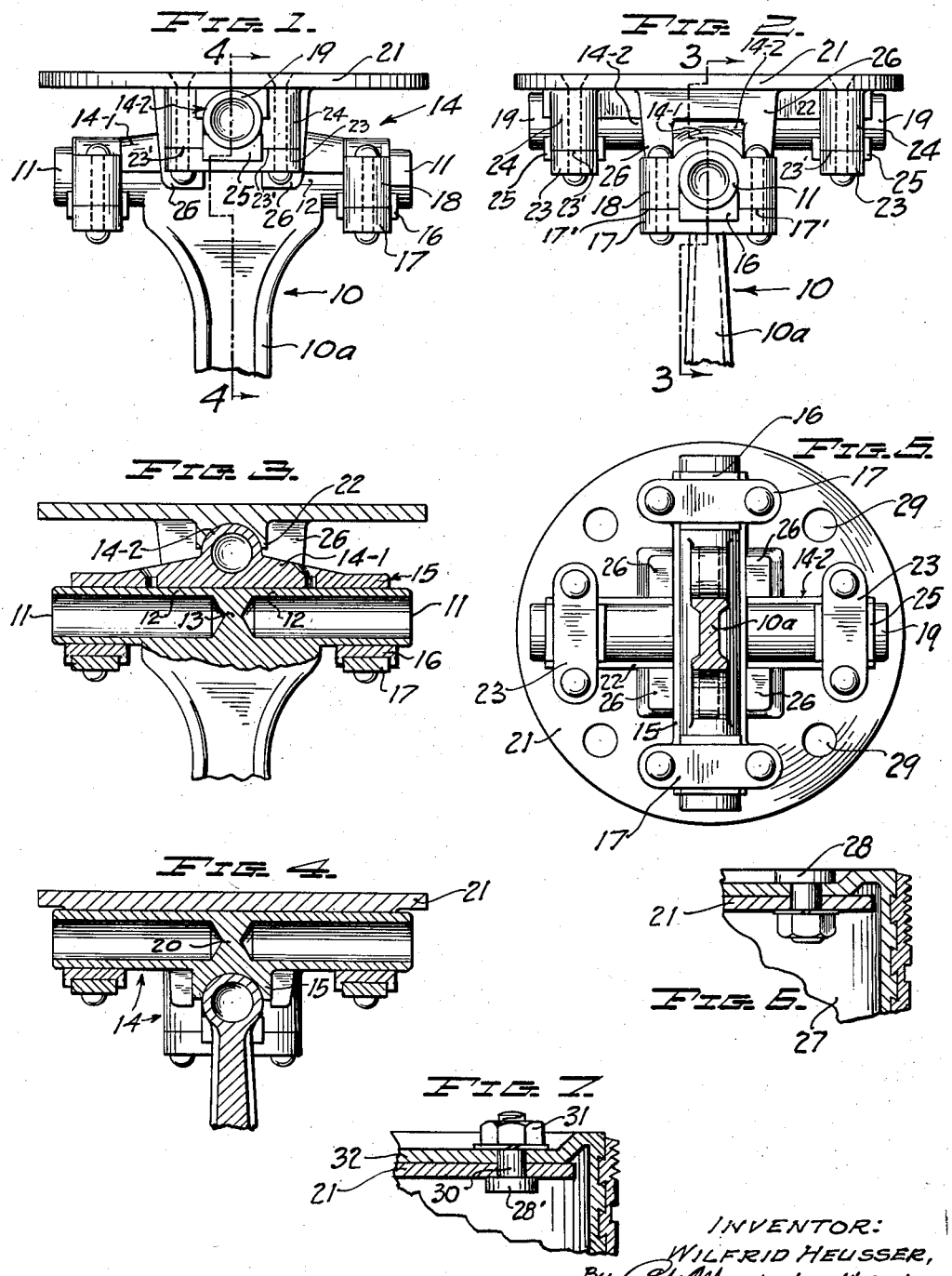
INVENTOR:
WILFRID HEUSSER,
By
Philip A. Wallinckrodt
ATTORNEYS.

Patented June 27, 1950

2,513,023

UNITED STATES PATENT OFFICE 2,513,023

PISTON AND CONNECTING ROD ASSEMBLY

Wilfrid Heusser, Salt Lake City, Utah

Application September 11, 1946, Serial No. 696,319

8 Claims. (Cl. 309—19)

This invention relates to piston and connecting rod assemblies, particularly as designed for use in internal combustion engines.

The conventional piston employed in internal combustion engines is provided with oppositely disposed internally extending bosses integral with the piston skirt, and is operatively associated with the crank shaft of the engine by means of a connecting rod having a wrist-pin journaled in the said opposing bosses of the piston skirt. Thus, the impact of the explosion is transmitted through the piston skirt and the said internally extending bosses thereof to the connecting rod, and thence to the crankshaft. Because of this, the piston must be of sufficiently heavy construction, and particularly the skirt thereof, to absorb and transmit the impact shocks.

In addition, it is conventional practice to provide a relatively loose fit for the piston within its cylinder, and to achieve the requisite tightness by means of resiliently expanding rings encircling the piston. The rings afford a certain amount of free sidewise movement of the piston within the cylinder, thereby accommodating any small lack of alignment between crankshaft, connecting rod, and cylinder, which is practically inevitable in the manufacture and assembly of these parts.

Principal objects of the instant invention are:

(a) To transmit the impact of explosions in the cylinder of an internal combustion engine to the connecting rod directly through the piston head rather than indirectly through the piston skirt.

(b) To so mount a piston on its connecting rod that it may be readily and simply removed and replaced therefrom without disturbing the articulative joint structure therebetween, or removing connecting rod from crank bearing.

(c) To make possible the use of a piston of considerably lighter construction than is ordinarily the case.

(d) To provide for accommodating, within the piston rather than between piston and cylinder sidewall, the unavoidable misalignments of the coacting parts, thereby making the piston completely self-aligning, and eliminating undesirable piston slap.

(e) To make practical the use of pistons which fit snugly within their cylinders, throughout length of piston.

(f) To locate the axes of the articulative joint between piston and connecting rod, as close as possible to the piston head, thereby largely eliminating toggle action between the two and improving the guiding action of piston within cylinder.

(g) To provide a piston and connecting rod assembly capable of superior performance, and productive of savings in fuel and lubricating oil.

In accomplishing these objects, I employ a piston which fits snugly within its cylinder, and provide a special articulative joint between connecting rod and piston, such joint embodying two independent elongated axes of oscillation disposed substantially at right angles to each other. One axis of oscillation accommodates the piston to the cylinder, while the other, which is parallel to the crank, functions in the manner of a wrist-pin. Limited freedom of movement longitudinally of this latter axis is provided for.

Further, I provide a foundation plate to which the connecting rod is secured by means of the aforesaid articulative joint, and secure the foundation plate to the innerside of the piston head. The securement is preferably one which is readily parted when desired, as, for example, by the use of bolts.

While many different types of snug-fitting pistons may be employed with the assembly of the invention, it is preferred to use the novel piston disclosed and claimed in my copending application for U. S. patent, Serial No. 696,318, filed September 11, 1946, and entitled "Piston."

These and other objects and features of the invention will be more fully understood from the following detailed description of the preferred specific construction illustrated in the accompanying drawings, wherein:

Fig. 1 represents an elevation of connecting rod, articulative joint, and foundation plate pursuant to the invention, the lower portion of the connecting rod being broken away;

Fig. 2, a similar elevation taken at right angles to that of Fig. 1;

Fig. 3, a section on the line 3—3, Fig. 2;

Fig. 4, a section on the line 4—4, Fig. 1;

Fig. 5, a bottom plan taken from the standpoint of Fig. 2; and

Figs. 6, 7, fragmentary views showing how a piston is removably secured to the foundation plate of the structural assembly of the prior figures.

Referring now to the drawing, the connecting rod 10 may be of any conventional formation, except as hereinafter set forth. At its lower end (not shown) it is provided with a bearing of customary type for receiving a crank of a conventional crankshaft.

The shank 10a flares outwardly at its upper end, and, as illustrated, terminates in laterally projecting gudgeons 11, 11 which, together with the interconnecting intermediate portion 12, serve in the capacity of a wrist-pin. These portions are, in the illustrated instance, integral with each other and with the shank 10a, though they may be formed and secured to the connecting rod proper in various ways which will be obvious to those skilled in the art. This wrist-pin arrangement, as it will hereinafter be termed, is parallel with the conventional bearing at the bottom of the connecting rod (not shown) which fits over a crank of the crankshaft, and provides one axis of oscillation in the articulate joint between connecting rod and piston. It is preferred for the sake of lightness of construction, that it be bored from the ends inwardly so as to leave only a centrally located web 13 between the bores, it being noted, however, that this web has substantial thickness for the purpose of transmitting impact.

A crosshead 14 is mounted on the above-described wrist-pin arrangement, it having a cradle 15 (see Fig. 4) formed throughout the length of its elongated lower portion 14—1 for receiving and journaling the upper curved surface of the wrist-pin arrangement. Pillow blocks 16, 16 fit over the lower curved surface of the respective gudgeons 11, 11 and are held tightly in position by means of rigid straps 17, 17, which are advantageously riveted to corresponding portions 18, 18 of the crosshead.

The crosshead 14 has an elongated upper journal portion 14—2, which extends rigidly at substantially right angles to the lower 14—1 and which may be, but is not necessarily made integral therewith. It has a formation substantially corresponding to that of the aforedescribed wrist-pin arrangement, and possesses oppositely extending gudgeons 19, 19, which are bored inwardly from their ends to leave the centrally located web 20.

Upon this journal 14—2 is mounted a foundation plate 21, whose underside possesses an elongated cradle formation 22, Fig. 3, fitting over the curved upper surface of the said journal. Rigid straps 23, 23, tightly secured, as by riveting, to corresponding depending bearing parts 24, 24, adjacent opposite ends of the cradle, provide for attachment of the crosshead 14 to the foundation plate, pillow blocks 25, 25 being interposed between the straps and gudgeons to complete the bearings. Pillow blocks 25, 25 are considerably less than coextensive with journal 14—2 in order to assure thorough splash lubrication which strikes the exposed surfaces of journal 14—2 between cradle 15 and the respective pillow blocks 25, as clearly shown in Figs. 2 and 5.

The journal 14—2 provides the second axis of oscillation in the articulate joint between piston and connecting rod.

It is desired that there be no longitudinal movement of the journal 14—2 within its cradle; also, that any side thrust exerted by the crank (not shown) upon the connecting rod be transmitted in a positive manner to the piston.

To these ends four spaced abutments, indicated 26 respectively, see particularly Fig. 5, depend from rigid securement at the underside of foundation plate 21 into abutting relationship with the lower portion 14—1 of the crosshead at opposite sides thereof. Such abutments may be conveniently integral with the foundation plate.

The foundation plate is secured to the innerside of the head of a piston, the articulative joint being located wholly within the piston. In Fig. 6 this is illustrated, the piston 27 being one of the type set forth in my afore-referred-to application Serial No. 696,318, and the securement being made by means of bolts 28 passing through openings 29, see Fig. 5, so the piston is readily removable and replaceable.

It can be easily seen that, since the only securement of connecting rod to piston is at the piston head, the impact of the explosions within the cylinder will be transmitted directly to the connecting rod without imposing stresses and strains on the piston skirt. The solid, centrally located webs 20 and 13 in the respective upper and lower wrist-pin arrangements make the column from piston head to crank substantially continuous. Accordingly, a piston having a relatively thin skirt, pressed steel for instance, may be employed advantageously. The piston acts primarily in a sealing and guiding capacity.

It should be noted that the flaring of the upper end of the connecting rod has a width appreciably less than the distance between pillow blocks 16, 16, so ample leeway for movement thereof longitudinally along the lower axis of oscillation, is afforded.

Thus, the articulative joint with its two elongated and right-angularly related axes of oscillation, one of which is movable longitudinally, provides for substantially universal movement of the piston relative to the connecting rod.

In the arrangement of Fig. 7, the bolts 28' have the necks 30 thereof made fast in the foundation plate while the nuts 31 are on the outer side of the piston head 32. Thus, by simply unscrewing the nuts 31, the piston can be conveniently taken out for reconditioning or other purposes without disturbing the other parts of the assembly—a great saving of time and labor over usual practice in renewing pistons.

The foundation plate, articulative joint and wrist-pin may advantageously be made of casehardening steel.

The pillow blocks 16 and 25 can be omitted and the surfaces 17' and 23' of the respective pillow straps 17 and 23 be extended to contact the respective gudgeons 11 and 19.

In summarizing the novel advantages of the invention it is in order to first point out four cardinal functions that become evident in analyzing the operation of an internal combustion engine, namely:

(1) The transmission of the expansive force of an exploding gas from the piston to the crankshaft.

(2) Guidance of the piston back and forth in the cylinder.

(3) Sealing of the moving piston in the cylinder so as to transform into useful work as high a percentage of the expansive force of the exploding gas as possible.

(4) Maintenance of a slight oil film between piston and cylinder wall to prevent scoring of these parts.

Moreover, in order to efficiently fulfill the performance of those functions, it is necessary that:

(1) Inasmuch as a straight line is the shortest distance between two points, the expansive force must be transmitted from piston to crankshaft in a straight line.

(2) A piston must be guided back and forth in its cylinder in a way that reduces the friction between the contacting surfaces to a minimum.

(3) The sealing of a piston in its cylinder must be distributed over as large an area as is consistent with the operating conditions, while at the same time the sealing area must be located in the zone of lowest prevailing temperatures.

(4) Scoring of the piston and cylinder must be prevented.

The device of the present invention along with that of the invention of the aforesaid co-pending application brings about compliance with the requirements just mentioned to a high degree; because there is a solid column of metal extending in a straight line from the piston head to its respective crank (not shown); because, the axis of the gudgeons 11 is close to the piston head, thereby reducing the alternating side thrusts with the accompanying frictional effects between piston and cylinder, to a minimum; because the distribution of the oil-packed sealing areas extend from end to end of the piston; and because the major portion of the sealing area is situated remote from the impact-taking face of the piston with the result that the oil packing is subject to least deterioration.

Whereas this invention has been illustrated and described with respect to a particular preferred construction, it should be understood that various changes may be made in said construction and other constructions may be made from time to time by those skilled in the art, without departing from the generic scope of the invention as defined by the following claims.

I claim:

1. In a piston and connecting rod assembly, an articulative joint comprising a wrist-pin arrangement at the appropriate end of the connecting rod; a crosshead including a cradle of axially open-trough formation partially journaling said wrist-pin arrangement, and including, further, as a fixed part of said crosshead, an elongate oscillation journal disposed at substantially right angles to said cradle; a foundation plate secured to the inner side of the piston head, and having a cradle of axially open-trough formation formed at the inner side thereof, providing a bearing for said oscillation journal; narrow bearing means securing said wrist-pin arrangement in the first of said cradles; and narrow bearing means securing said oscillation journal within the second of said cradles, said bearing means being sufficiently narrow in both instances, to expose a major portion of the uncradled areas of said wrist-pin arrangement and said oscillation journal, respectively, to splash-lubrication.

2. Structure as set forth in claim 1, wherein abutments extend from the foundation plate into laterally abutting relationship with the respective cradles at opposite sides thereof, respectively.

3. Structure as set forth in claim 1, wherein the wrist-pin arrangement is substantially integral with the connecting rod by means of a portion that flares from the connecting rod to the wrist-pin arrangement.

4. Structure as set forth in claim 1, wherein the crosshead is integrally formed.

5. Structure as set forth in claim 1, wherein the oscillation journal mounting the piston is disposed substantially immediately above the cradle mounting the connecting rod, and is also disposed substantially immediately below the inner surface of the piston head.

6. In a crosshead structure having an open-trough bearing arranged to link a piston to a connecting rod having a journal, the combination comprising an axially open bearing trough and a journal disposed crosswise of, and closely adjacent said bearing trough; said journal having exposed surfaces for receiving splash lubrication; means linking the crosshead journal to said piston; and means journaling said connecting rod in said open-trough bearing.

7. In a piston and connecting rod assembly, the combination of an elongate journal formed at the piston end of the connecting rod and extending transversely thereof as a wrist-pin; a circular plate substantially coextensive with the inside face of the piston head and adapted to be secured thereto about its circumferential margin by fastening elements which extend through said plate; an open-trough cradle formed internally with said plate diametrically across the inner face thereof; a crosshead having an elongate journal extending at right angles to an elongate open-trough cradle; bearing means securing said journal of the crosshead within said open-trough cradle of the plate for oscillation; and bearing means securing said journal of the connecting rod within said open-trough cradle of the crosshead for oscillation.

8. The combination recited in claim 7, wherein spaced abutments extend inwardly from the circular plate in laterally abutting relationship with the respective cradles at opposite sides thereof, respectively.

WILFRID HEUSSER.

REFERENCES CITED

The following references are of record in the file of this patent:

UNITED STATES PATENTS

| Number | Name | Date |
|---|---|---|
| 727,937 | Haase | May 12, 1903 |
| 1,281,196 | Norrbom | Oct. 8, 1918 |
| 1,312,880 | Turner | Aug. 12, 1919 |
| 1,322,748 | Bachman | Nov. 25, 1919 |
| 1,588,137 | Myers | June 8, 1926 |
| 1,734,244 | Bingman | Nov. 5, 1929 |
| 1,762,541 | Blowers | June 10, 1930 |
| 1,943,364 | Betz | Jan. 16, 1934 |
| 2,093,594 | Wild et al. | Sept. 21, 1937 |
| 2,234,124 | Jones | Mar. 4, 1941 |

FOREIGN PATENTS

| Number | Country | Date |
|---|---|---|
| 16,841 | Great Britain | July 23, 1907 |